United States Patent  
Hsiang

(10) Patent No.: US 12,526,396 B2
(45) Date of Patent: Jan. 13, 2026

(54) EYE-PROTECTING DISPLAY APPARATUS AND EYE-PROTECTING DISPLAY METHOD

(71) Applicant: Qisda Corporation, Taoyuan (TW)

(72) Inventor: Shih-Min Hsiang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 59 days.

(21) Appl. No.: 18/751,351

(22) Filed: Jun. 24, 2024

(65) Prior Publication Data

US 2025/0055971 A1 Feb. 13, 2025

(30) Foreign Application Priority Data

Aug. 7, 2023 (CN) .......................... 202310982928.3

(51) Int. Cl.
*H04N 13/351* (2018.01)
*H04N 13/282* (2018.01)
*H04N 13/368* (2018.01)

(52) U.S. Cl.
CPC ......... *H04N 13/351* (2018.05); *H04N 13/282* (2018.05); *H04N 13/368* (2018.05)

(58) Field of Classification Search
CPC .. H04N 13/351; H04N 13/282; H04N 13/368; G09G 2320/0686; G09G 2360/144; G09G 5/10; G09G 2320/0626; G09G 2320/0666; G09G 2354/00; G09G 3/3406; G09G 3/3413
USPC ........................................................ 348/51
See application file for complete search history.

(56) References Cited

U.S. PATENT DOCUMENTS

| 2007/0118868 A1* | 5/2007 | Zhang ................ H04N 21/4316 725/105 |
| 2010/0159430 A1* | 6/2010 | Lee ........................ H04N 7/142 434/350 |
| 2012/0300080 A1* | 11/2012 | Batson ............. H04N 21/23412 348/E7.085 |
| 2013/0050398 A1* | 2/2013 | Krans .................... H04N 7/147 348/E7.083 |
| 2013/0120521 A1* | 5/2013 | Cope ........................ H04N 7/15 348/14.07 |
| 2014/0198196 A1* | 7/2014 | Howard ............... G06V 40/171 348/78 |

FOREIGN PATENT DOCUMENTS

| CN | 110517645 | 11/2019 |
| TW | I411987 | 10/2013 |

* cited by examiner

Primary Examiner — Tung T Vo

(57) ABSTRACT

An eye-protecting display apparatus including a display panel, a sensor, and a controller is provided. The display panel is configured to provide a display frame. The sensor is configured to sense a plurality of users around the display panel. The controller is electrically connected to the sensor and the display panel and configured to receive and analyze a signal from the sensor. The controller is configured to divide the users into a lecturer and an audience, analyze an area of the display panel sheltered by the lecturer by distances of the lecturer and the audience relative to the display panel and a position and angle relationship therebetween, and adaptively adjust a brightness or a blue light proportion of at least a portion of the area. An eye-protecting display method is also provided.

18 Claims, 5 Drawing Sheets

EYE-PROTECTING DISPLAY APPARATUS AND EYE-PROTECTING DISPLAY METHOD

CROSS-REFERENCE TO RELATED APPLICATION

This application claims the priority benefit of China application serial no. 202310982928.3, filed on Aug. 7, 2023. The entirety of the above-mentioned patent application is hereby incorporated by reference herein and made a part of this specification.

BACKGROUND OF THE INVENTION

Field of the Invention

The invention relates to a display apparatus and a display method, and particularly to an eye-protecting display apparatus and an eye-protecting display method.

Description of Related Art

The modern electronic whiteboard has high brightness so that the audience may view the frame clearly. However, when the lecturer stands in front of the electronic whiteboard for a long time to operate and use a writing tool, they are in close contact with the electronic whiteboard for a long time, so the eyes are readily damaged by long-term high-brightness stimulation.

When the lecturer approaches the electronic whiteboard at a close distance, some areas are sheltered by the lecturer. The audience may not see this portion, but the eyes of the lecturer need to receive the strong light from these areas, thus damaging the eyes.

Moreover, the high-brightness light emitted by the electronic whiteboard contains stronger blue light, and the eyes of the lecturer may be readily damaged when receiving high-intensity blue light at close range.

SUMMARY OF THE INVENTION

The invention provides an eye-protecting display apparatus that may effectively protect an eye of a lecturer without significantly affecting a viewing effect of an audience.

The invention provides an eye-protecting display method that may effectively protect an eye of a lecturer without significantly affecting a viewing effect of an audience.

An embodiment of the invention provides an eye-protecting display apparatus including a display panel, a sensor, and a controller. The display panel is configured to provide a display frame. The sensor is configured to sense a plurality of users around the display panel. The controller is electrically connected to the sensor and the display panel and configured to receive and analyze a signal from the sensor. The controller is configured to divide the users into a lecturer and an audience, analyze an area of the display panel sheltered by the lecturer by distances of the lecturer and the audience relative to the display panel and a position and angle relationship therebetween, and adaptively adjust a brightness or a blue light proportion of at least a portion of the area.

An embodiment of the invention provides an eye-protecting display method, including: providing a display frame by a display panel; sensing a plurality of users around the display panel by a sensor; receiving and analyzing a signal from the sensor; dividing the users into a lecturer and an audience; analyzing an area of the display panel sheltered by the lecturer, and adaptively adjusting a brightness or a blue light proportion of at least a portion of the area by distances of the lecturer and the audience relative to the display panel and a position and angle relationship therebetween.

In the eye-protecting display apparatus and the eye-protecting display method of the embodiments of the invention, by utilizing the distances of the lecturer and the audience relative to the display panel and the position and angle relationship therebetween, the area of the display panel sheltered by the lecturer is analyzed, and the brightness or the blue light proportion of at least a portion of this area is adjusted adaptively. Therefore, the eye-protecting display apparatus and the eye-protecting display method of the embodiments of the invention may effectively protect an eye of the lecturer without affecting the viewing effect of the audience.

DESCRIPTION OF THE EMBODIMENTS

Figure 1:
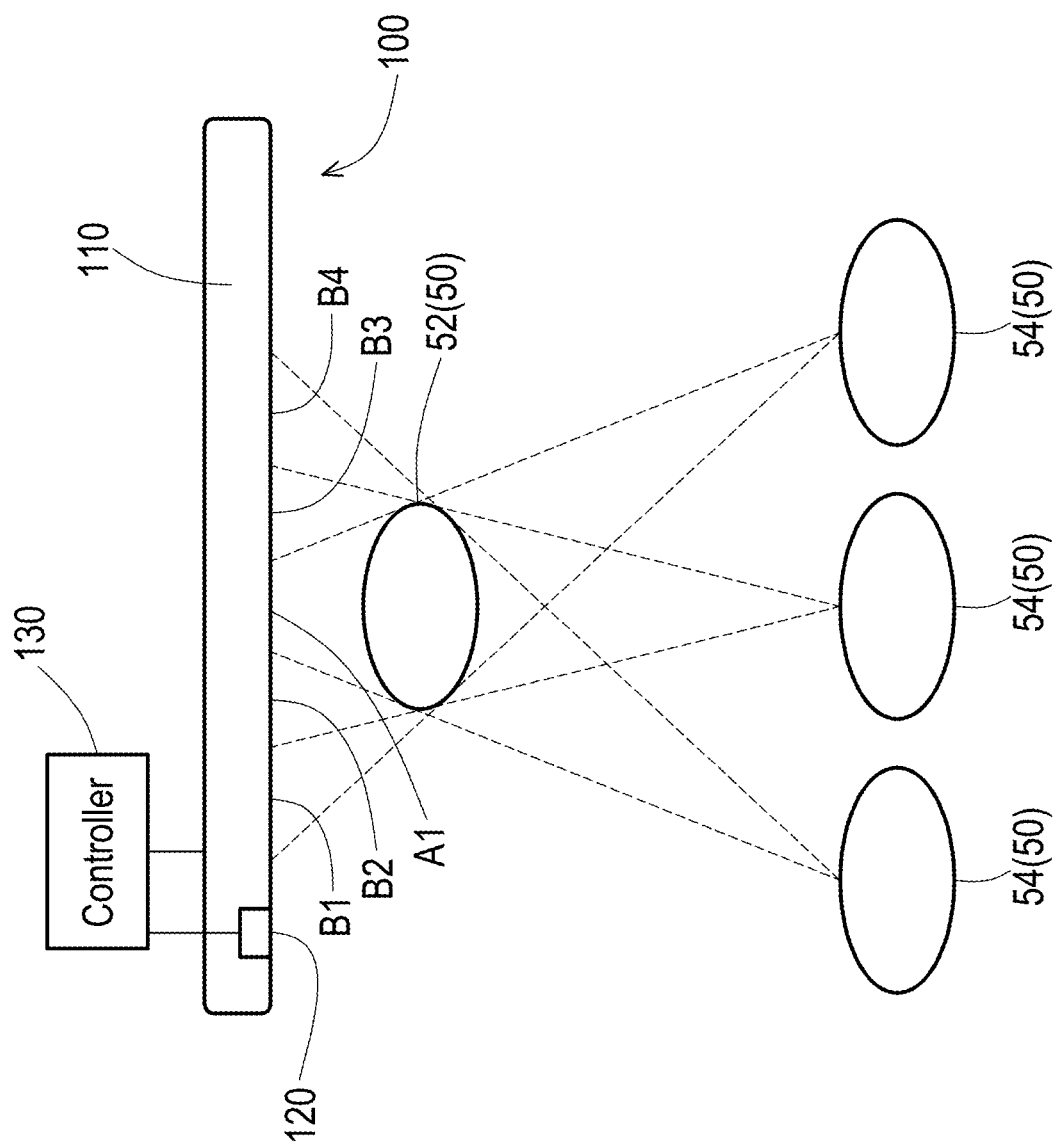
FIG. 1 is a schematic top view of the positional relationship between an eye-protecting display apparatus, a lecturer, and an audience of an embodiment of the invention.
Figure 2:
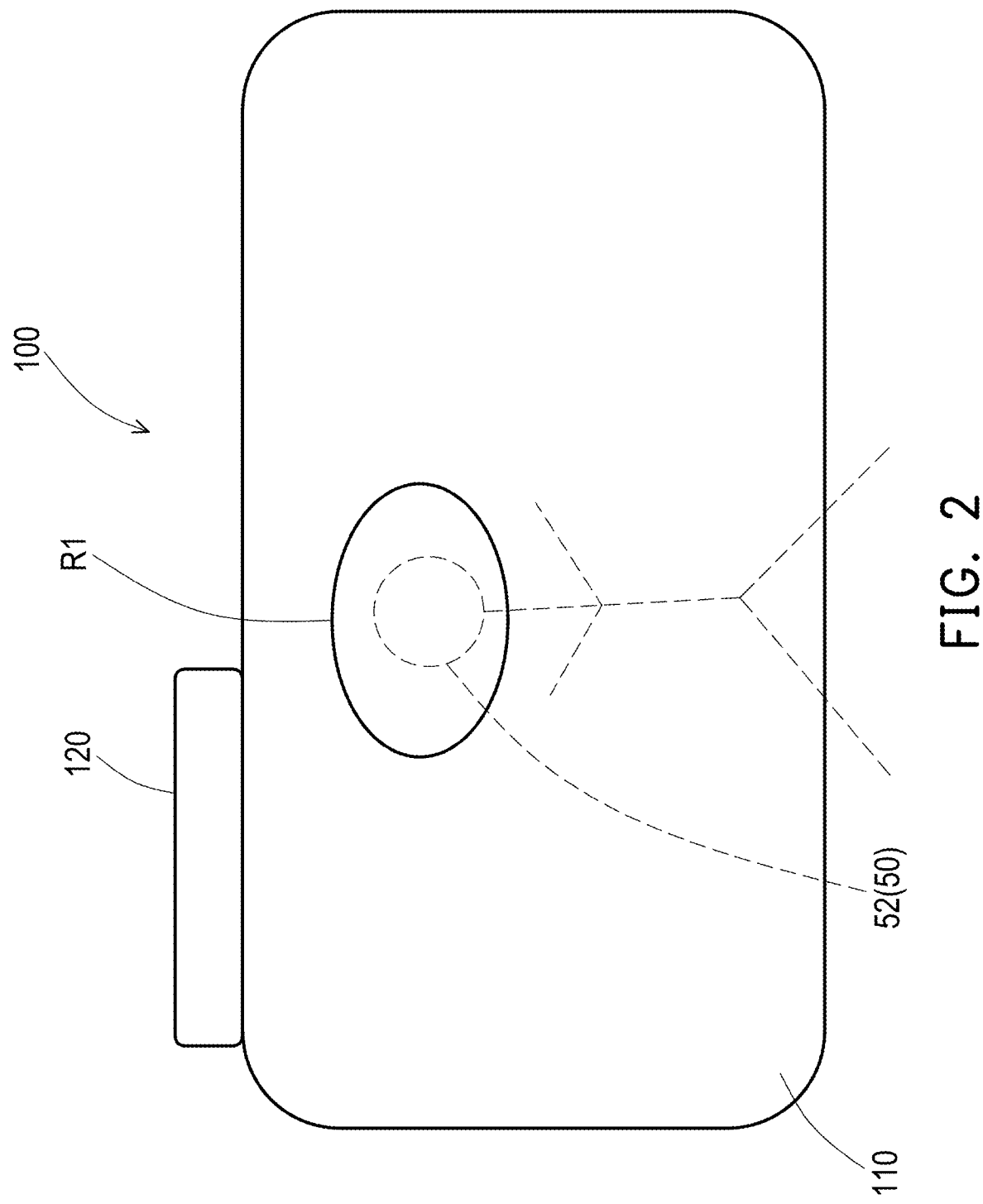
FIG. 2 is a schematic front view of the eye-protecting display apparatus of FIG. 1.
Figure 3:
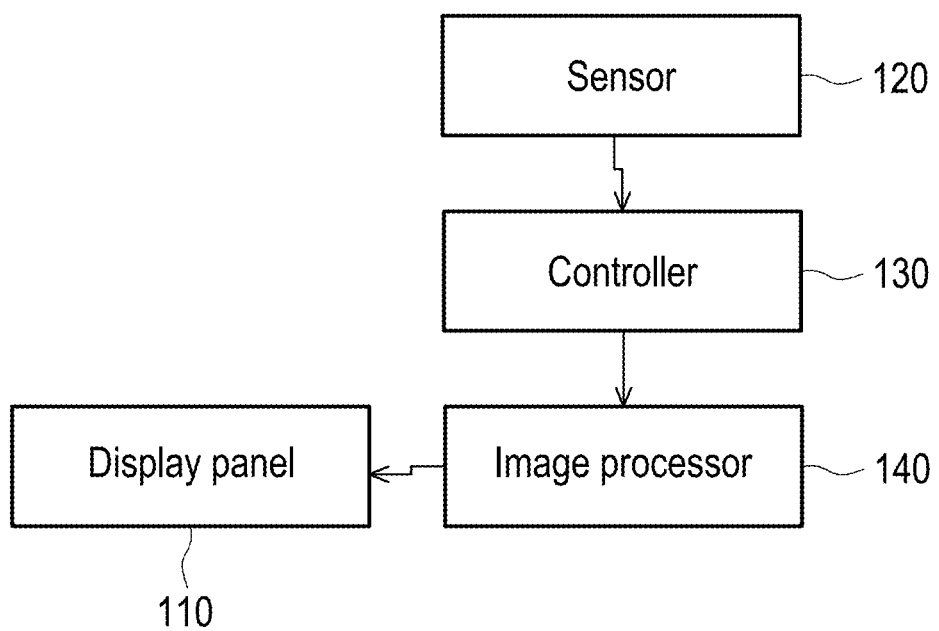
FIG. 3 is a system block diagram of the eye-protecting display apparatus of FIG. 1.

FIG. 1 is a schematic top view of the positional relationship between an eye-protecting display apparatus, a lecturer, and an audience of an embodiment of the invention. FIG. 2 is a schematic front view of the eye-protecting display apparatus of FIG. 1. FIG. 3 is a system block diagram of the eye-protecting display apparatus of FIG. 1. Referring to FIG. 1, FIG. 2, and FIG. 3, an eye-protecting display apparatus 100 of the present embodiment includes a display panel 110, a sensor 120, and a controller 130. The display panel 110 is configured to provide a display frame. In the present embodiment, the display panel 110 is, for example, an electronic whiteboard, a liquid-crystal display, an organic light-emitting diode display, a light-emitting diode display, a plasma display, or other suitable displays. The sensor 120 configured to sense a plurality of users 50 around the display panel 110. In the present embodiment, the sensor 120 may include a camera, a distance sensor, or a combination thereof. In an embodiment, the sensor 120 may also include at least two cameras, and the images of two different viewing angles captured thereby may be used by the controller 130 to calculate the distances between the users 50 and the display panel 110 via triangulation.

The controller 130 is electrically connected to the sensor 120 and the display panel 110 and configured to receive and analyze a signal from the sensor 120. The controller 130 is configured to divide the users into a lecturer 52 and an audience 54, analyze an area A1 of the display panel 110 sheltered by the lecturer 52 by distances of the lecturer 52 and the audience 54 relative to the display panel 110 and a position and angle relationship therebetween, and adaptively adjust a brightness or a blue light proportion of at least a portion of the area A1, for example, reduce the brightness or the blue light proportion of at least a portion of the area A1 to protect an eye of the lecturer 52.

In the present embodiment, the controller 130 determines at least one user is the lecturer 52 in response to the distance of the at least one user 50 relative to the display panel 110 being less than a threshold value. In addition, in the present embodiment, the controller 130 may be set by any user and adjust the threshold value adaptively. In an embodiment, the controller 130 determines one in several users 50 closest to the display panel 110 is the lecturer 52 and determines the others in the several users 50 are the audience 54 in response to the distances of the several users 50 relative to the display panel 110 being all less than a threshold value.

In the present embodiment, the eye-protecting display apparatus 100 further includes an image processor 140 (as shown in FIG. 3) electrically connected to the controller 130 and the display panel 110, wherein the controller 130 is configured to adjust the brightness or the blue light proportion of at least a portion of the area A1 via the image processor 140.

In the eye-protecting display apparatus 100 of the present embodiment, since by utilizing the distances of the lecturer 52 and the audience 54 relative to the display panel 110 and the position and angle relationship therebetween, the area A1 of the display panel 110 sheltered by the lecturer 52 is analyzed, and the brightness or the blue light proportion of at least a portion of the area A1 is adjusted adaptively, the eye-protecting display apparatus 100 of the present embodiment may effectively protect the eye of the lecturer 52. Moreover, since the area A1 for adjusting the brightness or the blue light proportion is the area A1 sheltered by the lecturer 52 and is less likely to be seen by the audience 54, adjusting the brightness or the blue light proportion of the area A1 does not significantly affect the viewing effect of the audience. Therefore, the eye-protecting display apparatus 100 of the present embodiment may achieve the best balance between the eye protection of the lecturer 52 and the quality of the image frame seen by the audience 54.

In the present embodiment, the controller 130 is configured to determine a visual range R1 of the eye of the lecturer 52 from the signal of the sensor 120 (as shown in FIG. 2) and adjust the brightness or the blue light proportion of the portion corresponding to the visual range R1 of the eye in the area A1. That is, the controller 130 may adjust the brightness or the blue light proportion only for a portion in the area A1. However, in another embodiment, the controller 130 may also adjust the brightness or the blue light proportion of the entire area A1, for example, reduce the brightness or the blue light proportion of the entire area A1 in order to achieve better power saving effect while protecting the eye of the lecturer 52.

In the present embodiment, the controller 130 is configured to analyze the set relationship of the display panel 110 relative to the plurality of areas of the plurality of audience 54 sheltered by the lecturer 52. For example, taking FIG. 1 as an example, the area sheltered by the lecturer 52 for the audience 54 at the right is an area B1 plus an area B2 and the area A1, the area in the middle of the audience 54 sheltered by the lecturer 52 is the area B2 plus the area A1 and an area B3, the area covered by the lecturer 52 for the audience 54 at the left is the area A1 plus the area B3 and an area B4, and the controller 130 may analyze that the intersection of the areas where the audience 54 is sheltered by the lecturer 52 is the area A1, and the intersection is the area B1 plus the area B2, the area A1, the area B3, and the area B4. Alternatively, the controller 130 may even analyze the differences between the areas where the audience 54 is sheltered by the lecturer 52.

In the present embodiment, the set relationship includes an intersection range (i.e., the area A1), and the controller 130 uses the intersection range as the area A1 of the display panel 110 sheltered by the lecturer.

In another embodiment, the set relationship includes a degree of sheltering relationship. The more the audience 54 is sheltered by the lecturer 52, the higher the degree of sheltering relationship of the area. The less the audience 54 is sheltered by the lecturer 52, the lower the degree of sheltering relationship of the area. For example, taking FIG. 1 as an example, three of the audience 54 are all sheltered by the lecturer 52 in the area A1, so the degree of sheltering of the area A1 is highest; two of the audience 54 are sheltered by the lecturer 52 in the area B2 and the area B3, so the degree of sheltering relationship between the area B2 and the area B3 is second; only one of the audience 54 is sheltered by the lecturer 52 in the area B1 and the area B4, so the degree of sheltering relationship between the area B1 and the area B4 is the lowest. In the present embodiment, the set relationship includes an intersection range, and this intersection range is used as the area of the display panel 110 sheltered by the lecturer (this area is, for example, the entire area B1, B2, A1, B3, and B4), wherein in low-sheltering areas (such as areas B1, B2, B3, and B4) for which the degree of sheltering relationship is lower, the corresponding degree of brightness or blue light adjustment is lower, for example, the reduction degree of the brightness or the blue light proportion is less. For example, the area A1 has the highest degree of sheltering, so the controller 130 reduces the brightness or the blue light proportion of the area A1 to the highest degree; the areas B2 and B3 have the second largest degree of sheltering, so the controller 130 reduces the brightness or the blue light proportion of the areas B2 and B3 to the second largest degree; and the areas B1 and B4 have the lowest degree of sheltering, so the controller 130 reduces the brightness or the blue light proportion of the areas B1 and B4 to the lowest degree.

In an embodiment, the controller 130 is, for example, a central processing unit (CPU), a microprocessor, a digital signal processor (DSP), a programmable controller, a programmable logic, a programmable logic device (PLD), other similar apparatuses, or a combination of these apparatuses, and the invention is not limited thereto. Moreover, in an embodiment, each function of the controller 130 may be implemented as a plurality of program codes. These program codes are stored in one memory, and the program codes are executed by the controller 130. Or, in an embodiment, each function of the controller 130 may be implemented as one or a plurality of circuits. The invention is not limited to using software or hardware to implement each function of the controller 130.

Figure 4:
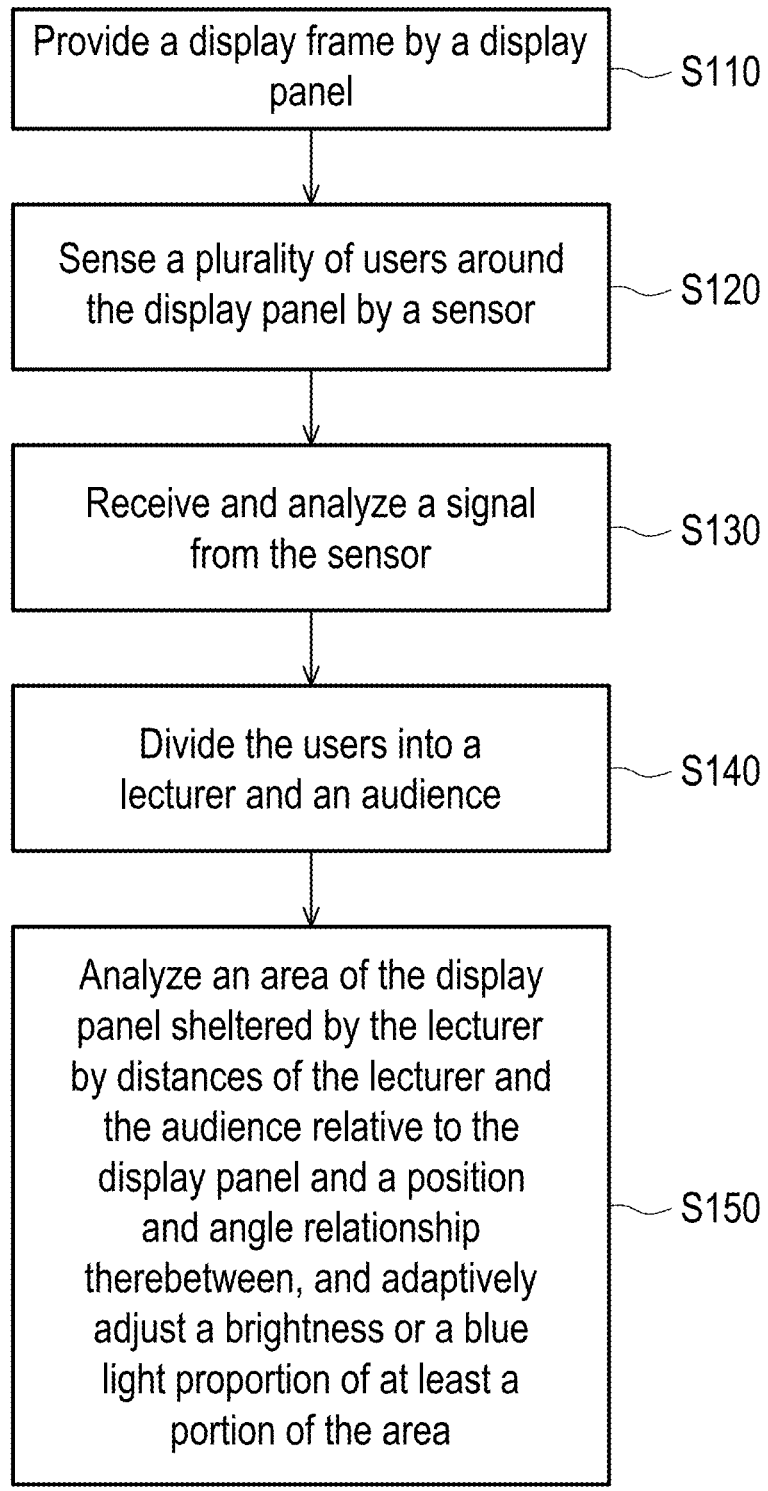
FIG. 4 is a flowchart of an eye-protecting display method of an embodiment of the invention.

FIG. 4 is a flowchart of an eye-protecting display method of an embodiment of the invention. Please refer to FIG. 1, FIG. 3, and FIG. 4. The eye-protecting display method of the present embodiment may be performed using the eye-protecting display apparatus 100 of FIG. 1, but the invention is not limited thereto. The eye-protecting display method of the present embodiment includes the following steps. First, step S110 is performed, in which a display frame is provided using the display panel 110. In addition, step S120 is performed, in which the plurality of users 50 around the display panel 110 are sensed using the sensor 120. Then, step S130 is performed, in which the controller 130 receives and analyzes the signal from the sensor 120. Next, step S140 is performed to divide these users 50 into the lecturer 52 and the audience 54. Then, step S150 is performed, in which the area A1 of the display panel 110 sheltered by the lecturer 52 is analyzed, and a brightness or a blue light proportion of at least a portion of the area A1 is adaptively adjusted by distances of the lecturer 52 and the audience 54 relative to the display panel 110 and a position and angle relationship therebetween. For other details of the eye-protecting display method of the present embodiment, reference may be made to the execution details described in the above embodiment of the eye-protecting display apparatus 100 and are not repeated here. In addition, the eye-protecting display method of the present embodiment may also achieve the advantages and effects obtained by the eye-protecting display apparatus 100, and are not repeated here.

Figure 5:
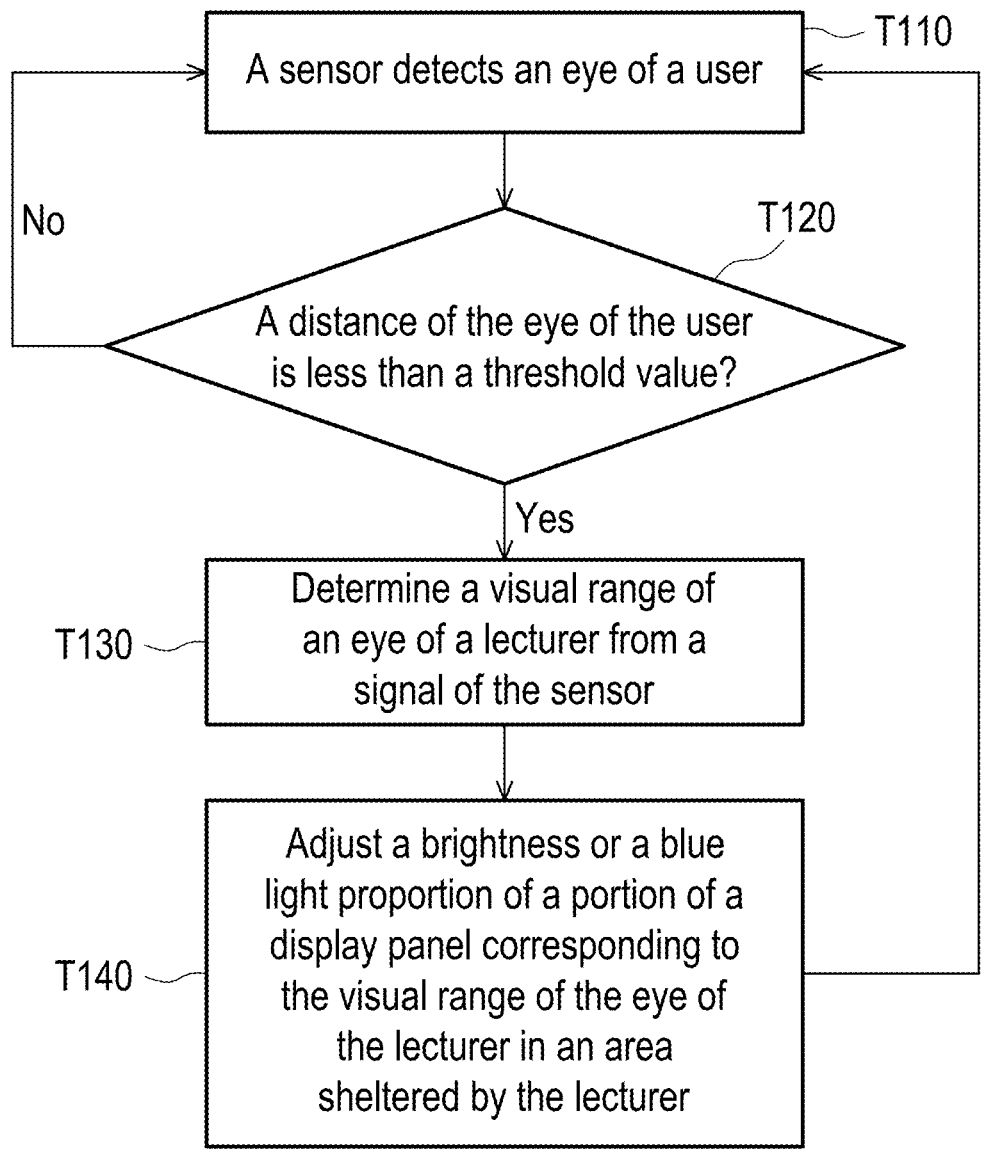
FIG. 5 is a flowchart for monitoring a user in the eye-protecting display method of an embodiment of the invention.

Please refer to FIG. 5. In an embodiment, the process of monitoring the users in the eye-protecting display method is shown in FIG. 5. The process may be performed by the eye-protecting display apparatus 100 of FIG. 1, and may include the following steps. First, step T110 is performed, in which the controller 130 instructs the sensor 120 to detect the eyes of the users 50. Next, step T120 is performed, in which whether the distance between the eyes of the users 50 and the display panel 110 is less than a threshold value is determined using the controller 130. If the determination result is no, indicating that there is no lecturer 52, step T110 is continued to further detect the eyes of the users 50. If the determination result is yes, step T130 is performed, in which the user 50 whose eye distance is less than the threshold value is regarded as the lecturer 52, and the visual range R1 of the eye of the lecturer 52 is determined from the signal of the sensor 120 (as shown in FIG. 2). Then, step T140 is performed, in which the brightness or the blue light proportion of the portion of the display panel 110 in the area A1 sheltered by the lecturer 52 corresponding to the visual range R1 of the eye of the lecturer 52 is adjusted. Then, step T110 is repeated to continue detecting the eyes of the users 50.

Based on the above, in the eye-protecting display apparatus and the eye-protecting display method of the embodiments of the invention, by utilizing the distances of the lecturer and the audience relative to the display panel and the position and angle relationship therebetween, the area of the display panel sheltered by the lecturer is analyzed, and the brightness or the blue light proportion of at least a portion of this area is adjusted adaptively. Therefore, the eye-protecting display apparatus and the eye-protecting display method of the embodiments of the invention may effectively protect the eye of the lecturer without significantly affecting the viewing effect of the audience.

What is claimed is:

1. An eye-protecting display apparatus, comprising:
a display panel configured to provide a display frame;
a sensor configured to sense a plurality of users around a display panel; and
a controller electrically connected to the sensor and the display panel and configured to receive and analyze a signal from the sensor, wherein the controller is configured to divide the users into a lecturer and an audience, and analyze an area of the display panel sheltered by the lecturer and adaptively adjust a brightness or a blue light proportion of at least a portion of the area using distances of the lecturer and the audience relative to the display panel and a position and angle relationship therebetween, and wherein the controller determines one in several users closest to the display panel is the lecturer and determines others in the several users are the audience in response to distances of the several users relative to the display panel being all less than a threshold value.

2. The eye-protecting display apparatus of claim 1, wherein the controller determines at least one of the users is a lecturer in response to a distance of the at least one user relative to the display panel being less than a threshold value.

3. The eye-protecting display apparatus of claim 2, wherein the controller may be set by any of the users and adjust a size of the threshold value adaptively.

4. The eye-protecting display apparatus of claim 1, wherein the controller is configured to determine a visual range of an eye of the lecturer from the signal of the sensor, and adjust a brightness or a blue light proportion of a portion in the area corresponding to the visual range of the eye.

5. The eye-protecting display apparatus of claim 1, wherein the controller is configured to analyze a set relationship of a plurality of areas of the display panel sheltered by the lecturer relative to a plurality of audience.

6. The eye-protecting display apparatus of claim 5, wherein the set relationship comprises an intersection range, and the intersection range is used as the area of the display panel sheltered by the lecturer.

7. The eye-protecting display apparatus of claim 5, wherein the set relationship comprises a shelter degree relationship.

8. The eye-protecting display apparatus of claim 7, wherein the set relationship comprises an intersection range, and the intersection range is used as the area of the display panel sheltered by the lecturer, and a corresponding degree of brightness or blue light adjustment of a low-sheltering area with a lower degree of sheltering relationship is lower.

9. The eye-protecting display apparatus of claim 1, further comprising an image processor electrically connected to the controller and the display panel, wherein the controller is configured to adjust the brightness or the blue light proportion of the at least a portion of the area via the image processor.

10. An eye-protecting display method, comprising:
providing a display frame by a display panel;
sensing a plurality of users around the display panel by a sensor;
receiving and analyzing a signal from the sensor;
dividing the users into a lecturer and an audience;
analyzing an area of the display panel sheltered by the lecturer, and adaptively adjusting a brightness or a blue light proportion of at least a portion of the area by distances of the lecturer and the audience relative to the display panel and a position and angle relationship therebetween; and
determining one in several users closest to the display panel is the lecturer and determining others in the several users are the audience in response to distances of the several users relative to the display panel being all less than a threshold value.

11. The eye-protecting display method of claim 10, further comprising determining at least one of the users is a lecturer in response to a distance of the at least one user relative to the display panel being less than a threshold value.

12. The eye-protecting display method of claim 11, further comprising adaptively adjusting a size of the threshold value via any user setting.

13. The eye-protecting display method of claim 10, further comprising determining a visual range of an eye of the lecturer from the signal of the sensor, and adjusting a brightness or a blue light proportion of a portion in the area corresponding to the visual range of the eye.

14. The eye-protecting display method of claim 10, further comprising analyzing a set relationship of a plurality of areas of the display panel sheltered by the lecturer relative to a plurality of audience.

15. The eye-protecting display method of claim 14, wherein the set relationship comprises an intersection range, and the intersection range is used as an area of the display panel sheltered by the lecturer.

16. The eye-protecting display method of claim 14, wherein the set relationship comprises a shelter degree relationship.

17. The eye-protecting display method of claim 16, wherein the set relationship comprises an intersection range, and the intersection range is used as the area of the display panel sheltered by the lecturer, and a corresponding degree of brightness or blue light adjustment of a low-sheltering area with a lower degree of sheltering relationship is lower.

18. The eye-protecting display method of claim 10, further comprising adjusting the brightness or the blue light proportion of the at least a portion of the area via an image processor.

\* \* \* \* \*